United States Patent
Ma et al.

(10) Patent No.: US 11,184,915 B2
(45) Date of Patent: Nov. 23, 2021

(54) SIDELINK COMMUNICATION METHOD, TERMINAL AND NETWORK EQUIPMENT

(71) Applicant: DATANG MOBILE COMMUNICATIONS EQUIPMENT CO., LTD., Beijing (CN)

(72) Inventors: Teng Ma, Beijing (CN); Rui Zhao, Beijing (CN); Fangchen Cheng, Beijing (CN); Yuan Feng, Beijing (CN); Lin Lin, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

(21) Appl. No.: 17/267,457

(22) PCT Filed: Jul. 31, 2019

(86) PCT No.: PCT/CN2019/098617
§ 371 (c)(1),
(2) Date: Feb. 9, 2021

(87) PCT Pub. No.: WO2020/029848
PCT Pub. Date: Feb. 13, 2020

(65) Prior Publication Data
US 2021/0266945 A1    Aug. 26, 2021

(30) Foreign Application Priority Data

Aug. 10, 2018 (CN) .......................... 201810912129.8
Aug. 13, 2018 (CN) .......................... 201810918247.X

(51) Int. Cl.
*H04W 72/12* (2009.01)
*H04W 76/14* (2018.01)
*H04W 4/40* (2018.01)

(52) U.S. Cl.
CPC ..... *H04W 72/1289* (2013.01); *H04W 72/1257* (2013.01); *H04W 76/14* (2018.02); *H04W 4/40* (2018.02)

(58) Field of Classification Search
CPC ..... H04W 4/40; H04W 4/42–46; H04W 28/12; H04W 72/1257; H04W 72/1289;
(Continued)

(56) References Cited

U.S. PATENT DOCUMENTS 10,716,134 B2 *  7/2020  Gulati ................. H04W 72/14
10,827,380 B2 * 11/2020  Rao .......................... H04W 4/40
(Continued)

FOREIGN PATENT DOCUMENTS

CN        106507500 A      3/2017
CN        107277738 A     10/2017
(Continued)

OTHER PUBLICATIONS

"Universal Mobile Telecommunications System (UMTS); Radio Resource Control (RRC); Protocol specification (3GPP TS 25.331 version 13.2.0 Release 13)", ETSI Technical Specification, 3GPP, ETSI TS 125 331 V13.2.0, published Apr. 2016, pp. 1, 106-107 (Year: 2016).*
(Continued)

*Primary Examiner* — Thomas R Cairns
(74) *Attorney, Agent, or Firm* — Ladas & Parry, LLP

(57) ABSTRACT

The present disclosure provides a sidelink communication method, a terminal and network equipment. The method includes: receiving, by a first terminal, resource configuration information sent by first network equipment; entering a distributed resource scheduling mode to perform sidelink communication with a second terminal if the resource configuration information sent by the first network equipment includes first preset information, otherwise, establishing
(Continued)

connection with second network equipment, and receiving resource configuration information sent by the second network equipment; entering the distributed resource scheduling mode to perform sidelink communication with the second terminal if the resource configuration information sent by the second network equipment includes second preset information; entering a centralized resource scheduling mode to perform sidelink communication with the second terminal if the resource configuration information sent by the second network equipment includes third preset information.

20 Claims, 6 Drawing Sheets

(58) Field of Classification Search
CPC . H04W 72/1294; H04W 72/14; H04W 76/14; H04W 84/18
See application file for complete search history.

(56) References Cited

U.S. PATENT DOCUMENTS

| | | | | |
|---|---|---|---|---|
| 10,869,296 | B2* | 12/2020 | Loehr | H04W 72/02 |
| 2017/0127413 | A1 | 5/2017 | Guan et al. | |
| 2018/0167990 | A1* | 6/2018 | Hua | H04W 72/04 |
| 2018/0376525 | A1 | 12/2018 | Feng | |
| 2019/0045337 | A1 | 2/2019 | Sun et al. | |
| 2019/0261398 | A1* | 8/2019 | Golitschek Edler von Elbwart | H04W 16/14 |
| 2019/0281641 | A1* | 9/2019 | Cheng | H04L 41/08 |
| 2020/0029384 | A1* | 1/2020 | Hong | H04W 36/34 |
| 2020/0367186 | A1* | 11/2020 | Tang | H04W 72/0453 |
| 2020/0412431 | A1* | 12/2020 | Park | H04B 7/0469 |
| 2021/0120617 | A1* | 4/2021 | Lee | H04W 72/02 |

FOREIGN PATENT DOCUMENTS

| | | | | |
|---|---|---|---|---|
| CN | 107295454 A | | 10/2017 | |
| CN | 108370565 A | | 8/2018 | |
| CN | 109565680 B | * | 10/2020 | H04W 16/10 |
| WO | 2017/128275 A1 | | 8/2017 | |
| WO | WO-2019062746 A1 | * | 4/2019 | H04W 72/08 |
| WO | WO-2019164353 A1 | * | 8/2019 | H04W 36/03 |

OTHER PUBLICATIONS

International Search Report and Written Opinion issued with respect to International Application No. PCT/CN2019/098617 dated Sep. 27, 2019.

Huawei, HiSilicon, "Discussion on resource pool sharing between mode3 and mode4 UEs," 3GPP TSG-RAN WG2 Meeting #99bis, R2-1710087, Oct. 2017, entire document.

Office Action issued with respect to Chinese Application No. 201810918247.X dated Jun. 24, 2020.

* cited by examiner

SIDELINK COMMUNICATION METHOD, TERMINAL AND NETWORK EQUIPMENT

CROSS-REFERENCE TO RELATED APPLICATIONS

This application is the U.S. national phase of PCT Application No. PCT/CN2019/098617 filed on Jul. 31, 2019, which claims priority to Chinese Patent Application No. 201810912129.8 filed in China on Aug. 10, 2018 and to Chinese Patent Application No. 201810918247. X filed in China on Aug. 13, 2018, the disclosures of which are incorporated in their entireties by reference herein.

TECHNICAL FIELD

The present disclosure relates to the technical field of communication, in particular to a sidelink communication method, a terminal and network equipment.

BACKGROUND OF THE INVENTION

In the communication system of 3GPP Long Term Evolution (LTE) Intelligent Vehicle-to-Everything (V2X), uplink/downlink communication is performed between a base station and a terminal through a Uu interface (a radio interface between a user terminal and a network), and sidelink communication is performed between terminals through a PC5 interface, i.e. a Proximity Communication Port 5. The LTE V2X technology in the related art supports the following two working modes:

a terminal contention mode: in this mode, transmission resource allocation and a modulation and coding scheme (MCS) format of user equipment (UE) or a terminal in the system is completely determined by the terminal itself (distributed), and the distributed scheduling function is realized by the method of "sensing+semi-persistent occupation" without the intervention of a base station. It is called Mode 2 in the LTE V2V standard, Mode 4 (Distributed Resource Scheduling Mode) in the LTE V2X and subsequent standards;

a base station scheduling mode: in this mode, the PC5 interface transmission resource and the MCS of the UE are both performed by the LTE base station, wherein the Uu interface of the LTE base station transmits a scheduling signaling to the terminal, and the terminal can also report measurement information to the base station through the Uu interface. It is called Mode 1 in the LTE V2V standard and Mode 3 (Centralized Resource Scheduling Mode) in the LTE V2X and subsequent standards.

In the base station scheduling mode, resource allocation in the system is dominated or assisted by the base station. Intra-coverage Uu interface communication is mainly used for forwarding V2X information through a Uu interface, the process follows most mechanisms of the LTE in the related art, uplink adopts a unicast mode, and the V2X terminal transmits the information to the base station (eNB); downlink adopts a broadcast or multicast mode, and the base station eNB transmits the information to other V2X terminals. According to different coupling degrees of the V2X terminal (UE) and the LTE base station network, the working modes are mainly divided into the following working modes:

a mode of UE working in Mode 3, that is, the LTE base station transmits a parameter configuration and a scheduling signaling to the UE through the Uu interface (2.6 GHz) to perform a cross-carrier configuration and scheduling on the UE which communicates through the PC5 interface in a dedicated frequency band (5.9 GHz), which belong to dynamic scheduling in coverage.

a mode of UE working in Mode 4, the LTE base station transmits parameters of a configured resource to the UE through the Uu interface (2.6 GHz), and after receiving the parameters, the terminal uses the configured resource in the dedicated frequency band (5.9 GHz) and communicates with other UEs through the PC5 interface, which belongs to an intra-coverage semi-static configuration.

a mode of UE working in Mode 4 without any cellular network assistance, that is, all UEs use preconfigured parameters indicating operation in the dedicated frequency band (5.9 GHz), which belongs to an extra-coverage scenario.

According to the allocation of LTE V2X spectrum, the LTE V2X can support PC5 interface communication on a dedicated carrier (5.9 GHz) and Uu interface and cellular shared carrier (2.6 GHz) communication respectively. In the coverage area of the E-UTRAN (LTE) network, whether a node of the V2X perform communication through Mode 3 or Mode 4 is judged according to the configuration information in the received signaling including a System Information Block 21 (SIB21) and a Radio Resource Control (RRC) reconfiguration message.

However, at the beginning of the development of NR, the terminal equipment based on NR technology will include a dual-module design, i.e. both an LTE communication module and an NR communication module, which ensures that the terminal equipment can communicate with a sidelink interface through both the LTE Uu and the NR Uu.

In the coverage area of the LTE cellular network, and the NR terminal includes two modules, namely the LTE communication module and the NR communication module: the LTE base station (eNB) communicates with the NR module of the terminal through the Uu interface to carry out resource allocation and control NR sidelink communication of the terminal. The eNB in the related art can only transmit the SIB21 message and the RRC reconfiguration message to the V2X terminal in an idle (IDLE) state according to a protocol in the related art to determine whether the communication mode is a centralized resource scheduling mode (Mode 3) or a distributed resource scheduling mode (Mode 4), but the NR V2X terminal adopts an updated technology, design and structure standard, therefore, whether the NR V2X terminal can normally receive and read the SIB21 and the RRC reconfiguration message sent by the eNB is a problem faced in the related art.

SUMMARY OF THE INVENTION

The embodiments of the present disclosure provide a sidelink communication method, a terminal and network equipment, which guarantee that an NR V2X terminal can normally perform sidelink communication with other terminals.

To solve the above technical problem, an embodiment of the present disclosure provides the following technical solution:

A sidelink communication method, including:

receiving, by a first terminal at least supporting new radio system (NR) communication, resource configuration information sent by first network equipment;

entering a distributed resource scheduling mode to perform sidelink communication with a second terminal if the resource configuration information sent by the first network equipment includes first preset information, otherwise, establishing connection with second network equipment, and receiving resource configuration information sent by the second network equipment;

entering the distributed resource scheduling mode to perform sidelink communication with the second terminal if the resource configuration information sent by the second network equipment includes second preset information;

entering a centralized resource scheduling mode to perform sidelink communication with the second terminal if the resource configuration information sent by the second network equipment includes third preset information; the second network equipment and the first network equipment are the same or different network equipment.

Wherein the resource configuration information is a new system information block (SIBNew) including a system information block (SIB21), a system information block (SIB23) or an SIBN including preset system information other than the SIB21 and the SIB23.

Wherein the entering a distributed resource scheduling mode to perform sidelink communication with a second terminal, includes: selecting a resource from resource pool information in the resource configuration information sent by the first network equipment; and performing sidelink communication with the second terminal according to the selected resource and the first preset information.

Wherein the second preset message includes: a terminal selection message; and the third preset message includes: a user scheduling message.

Wherein the establishing connection with second network equipment, and receiving resource configuration information sent by the second network equipment, includes: establishing connection with the second network equipment, receiving a radio resource control signaling (RRC) message sent by the second network equipment; and obtaining the resource configuration information according to the RRC message.

Wherein the entering a centralized resource scheduling mode to perform sidelink communication with the second terminal, includes: transmitting a resource scheduling request to the second network equipment; receiving resource configuration information in the centralized resource scheduling mode sent by the second network equipment; and performing sidelink communication with the second terminal according to the resource configuration information in the centralized resource scheduling mode.

Wherein before transmitting the resource scheduling request to the first network equipment, the method further includes: performing initialization with the second network equipment.

Wherein the receiving resource configuration information in the centralized resource scheduling mode sent by the second network equipment, includes: receiving downlink control information (DCI FormatN) sent by the second network equipment; and obtaining the resource configuration information in the centralized resource scheduling mode according to the DCI FormatN.

Wherein the DCI FormatN includes: at least one of a scheduling mode indication, a time domain resource granularity indication of a transmission service, a time-frequency domain resource position indication of the transmission service, a cross-carrier scheduling indication, a frequency hopping indication, a frequency hopping resource position indication, a modulation and demodulation level, a Band Width Part (BWP) indication and a frequency domain resource subcarrier spacing.

In some embodiments of the present disclosure, the DCI FormatN includes: a semi-persistent scheduling activation/deactivation indication.

Wherein the performing sidelink communication with the second terminal according to the resource configuration information in the centralized resource scheduling mode, includes: transmitting a scheduling control signaling and/or service information to the second terminal on a granted resource of the resource configuration information in the centralized resource scheduling mode.

Wherein before performing initialization with the second network equipment, the method further includes: obtaining, by the second network equipment, the resource configuration information in the centralized resource scheduling mode from the first network equipment.

Wherein before the performing sidelink communication with the second terminal, the method further includes: performing resource partitioning and/or reallocation on granted resources of the resource configuration information.

Wherein the resource configuration information includes: at least one of a communication mode indication, a subcarrier spacing indication, a time domain resource granularity indication of a transmission service, a time-frequency domain resource position indication of the transmission service, a carrier index supporting transmission and reception, a supportable Band Width Part (BWP) index on each supportable carrier, a corresponding parameter under the Band Width Part (BWP) index, and a time division multiplexing (TDM)/frequency division multiplexing (FDM) indication.

Wherein the communication mode indication includes: a distributed resource scheduling mode or a centralized resource scheduling mode.

Wherein the corresponding parameter under the Band Width Part (BWP) index includes: a time domain resource granularity being capable of supporting service transmission and a frequency domain resource subcarrier spacing configuration and/or a frequency domain resource position corresponding to the Band Width Part index.

Wherein the first network equipment is a first base station supporting Long Term Evolution (LTE), LTE-A or eLTE or a second base station supporting an NR system, and the second network equipment is a second base station supporting an NR system or a first base station supporting Long Term Evolution (LTE), LTE-A or eLTE.

An embodiment of the present disclosure further provides a method for controlling a terminal to perform sidelink communication, including:

transmitting resource configuration information to a first terminal at least supporting new radio system (NR) communication;

controlling the terminal to enter a distributed resource scheduling mode to perform sidelink communication with a second terminal if the resource configuration information sent by first network equipment includes first preset information, otherwise, controlling the terminal to establish connection with second network equipment, and transmitting, by the second network equipment, resource configuration information to the first terminal;

controlling the terminal to enter the distributed resource scheduling mode to perform sidelink communication with the second terminal if the resource configuration information sent by the second network equipment to the terminal includes second preset information;

controlling the terminal to enter a centralized resource scheduling mode to perform sidelink communication with the second terminal if the resource configuration information sent by the second network equipment to the terminal includes third preset information, the second network equipment and the first network equipment are the same or different network equipment.

Wherein the resource configuration information is a new system information block (SIBNew) including a system information block (SIB21), a system information block (SIB23) or an SIBN including preset system information other than the SIB21 and the SIB23.

Wherein the controlling the terminal to enter a centralized resource scheduling mode to perform sidelink communication with the second terminal, includes: receiving a resource scheduling request sent by the first terminal;

transmitting resource configuration information in the centralized resource scheduling mode to the first terminal; and enabling the first terminal to perform sidelink communication with the second terminal according to the resource configuration information in the centralized resource scheduling mode.

Wherein before receiving the resource scheduling request sent by the first terminal, the method further includes: performing initialization with the first terminal.

Wherein the resource configuration information in the centralized resource scheduling mode transmitted to the first terminal, includes: downlink control information (DCI FormatN) transmitted to the first terminal, and the DCI FormatN carries the resource configuration information in the centralized resource scheduling mode.

Wherein the DCI FormatN includes: at least one of a scheduling mode indication, a time domain resource granularity indication of a transmission service, a time-frequency domain resource position indication of the transmission service, a cross-carrier scheduling indication, a frequency hopping indication, a frequency hopping resource position indication, a modulation and demodulation level, a Band Width Part (BWP) indication and a frequency domain resource subcarrier spacing.

In some embodiments of the present disclosure, the DCI FormatN includes: a semi-persistent scheduling activation/ deactivation indication.

Wherein, before performing initialization with the first terminal, the method further includes: obtaining, by the second network equipment, the resource configuration information in the centralized resource scheduling mode from the first network equipment.

Wherein the resource configuration information includes: at least one of a communication mode indication, a subcarrier spacing indication, a time domain resource granularity indication of a transmission service, a time-frequency domain resource position indication of the transmission service, a carrier index supporting transmission and reception, a supportable Band Width Part (BWP) index supportable on each supportable carrier, a corresponding parameter under the Band Width Part (BWP) index, and a time division multiplexing (TDM)/frequency division multiplexing (FDM) indication.

An embodiment of the present disclosure further provides a terminal, the terminal being a first terminal supporting new radio system (NR) communication, including:

a transceiver, configured to receive resource configuration information sent by first network equipment; and a processor, configured to enter a distributed resource scheduling mode to perform sidelink communication with a second terminal when the resource configuration information sent by the first network equipment includes first preset information, otherwise, establish connection with second network equipment, and receive resource configuration information sent by the second network equipment;

enter the distributed resource scheduling mode to perform sidelink communication with the second terminal when the resource configuration information sent by the second network equipment includes second preset information;

enter a centralized resource scheduling mode to perform sidelink communication with the second terminal when the resource configuration information sent by the second network equipment includes third preset information, wherein the second network equipment is the same as or different from the first network equipment; the second network equipment and the first network equipment are the same or different network equipment.

An embodiment of the present disclosure further provides a measuring device for measuring a value of a synchronizing signal block applied to a first terminal supporting new radio system (NR) communication, including:

a transceiving module, configured to receive resource configuration information sent by first network equipment; and a processing module, configured to enter a distributed resource scheduling mode to perform sidelink communication with a second terminal when the resource configuration information sent by the first network equipment includes first preset information, otherwise, establish connection with second network equipment, and receive resource configuration information sent by the second network equipment;

enter the distributed resource scheduling mode to perform sidelink communication with the second terminal when the resource configuration information sent by the second network equipment includes second preset information;

enter a centralized resource scheduling mode to perform sidelink communication with the second terminal when the resource configuration information sent by the second network equipment includes third preset information, wherein the second network equipment is the same as or different from the first network equipment; the second network equipment and the first network equipment are the same or different network equipment.

An embodiment of the present disclosure further provides network equipment being first network equipment, including: a transceiver, configured to transmit resource configuration information to a first terminal at least supporting new radio system (NR) communication; and a processor, configured to control the terminal to enter a distributed resource scheduling mode to perform sidelink communication with a second terminal when the resource configuration information sent by the first network equipment includes first preset information, otherwise, control the first terminal to establish connection with second network equipment, and transmit resource configuration information by the second network equipment to the first terminal;

control the terminal to enter the distributed resource scheduling mode to perform sidelink communication with the second terminal when the resource configuration information sent by the second network equipment to the terminal includes second preset information;

control the terminal to enter a centralized resource scheduling mode to perform sidelink communication with the second terminal when the resource configuration information sent by the second network equipment to the terminal includes third preset information; the second network equipment and the first network equipment are the same or different network equipment.

An embodiment of the present disclosure further provides a device for controlling a terminal to perform sidelink communication applied to first network equipment, including:

a transceiving module, configured to transmit resource configuration information to a first terminal at least supporting new radio system (NR) communication; and a processing module, configured to control the terminal to enter a distributed resource scheduling mode to perform sidelink communication with a second terminal when the resource configuration information sent by the first network equipment includes first preset information, otherwise, control the first terminal to establish connection with second network equipment, and transmit resource configuration information by the second network equipment to the first terminal;

control the terminal to enter the distributed resource scheduling mode to perform sidelink communication with the second terminal when the resource configuration information sent by the second network equipment to the terminal includes second preset information;

control the terminal to enter a centralized resource scheduling mode to perform sidelink communication with the second terminal when the resource configuration information sent by the second network equipment to the terminal includes third preset information; the second network equipment and the first network equipment are the same or different network equipment.

An embodiment of the present disclosure further provide a terminal being a first terminal at least supporting new radio system (NR) communication, including: a processor, configured to: receive resource configuration information sent by first network equipment; enter a distributed resource scheduling mode to perform sidelink communication with a second terminal if the resource configuration information sent by the first network equipment includes first preset information, otherwise, establish connection with second network equipment, and receive resource configuration information sent by the second network equipment; enter the distributed resource scheduling mode to perform sidelink communication with the second terminal if the resource configuration information sent by the second network equipment includes second preset information; enter a centralized resource scheduling mode to perform sidelink communication with the second terminal if the resource configuration information sent by the second network equipment includes third preset information; the second network equipment and the first network equipment are the same or different network equipment.

An embodiment of the present disclosure further provides network equipment being first network equipment, including: a processor, configured to: transmit resource configuration information to a first terminal at least supporting new radio system (NR) communication; control the terminal to enter a distributed resource scheduling mode to perform sidelink communication with a second terminal when the resource configuration information sent by the first network equipment includes first preset information, otherwise, control the first terminal to establish connection with second network equipment, and transmit the resource configuration information to the first terminal by the second network equipment; control the terminal to enter the distributed resource scheduling mode to perform sidelink communication with the second terminal when the resource configuration information sent by the second network equipment to the terminal includes second preset information; control the terminal to enter a centralized resource scheduling mode to perform sidelink communication with the second terminal when the resource configuration information sent by the second network equipment to the terminal includes third preset information; the second network equipment and the first network equipment are the same or different network equipment.

An embodiment of the present disclosure further provides a computer storage medium including instructions that, when executed on a computer, cause the computer to perform the above methods.

Advantageous effects of the embodiments of the present disclosure are:

in the above embodiments of the present disclosure, the resource configuration information sent by the first network equipment is received by the first terminal at least supporting new radio system (NR) communication; the distributed resource scheduling mode is entered to perform sidelink communication with the second terminal if the resource configuration information sent by the first network equipment includes the first preset information, otherwise, connection with the second network equipment is established and the resource configuration information sent by the second network equipment is received; the distributed resource scheduling mode is entered to perform sidelink communication with the second terminal if the resource configuration information sent by the second network equipment includes the second preset information; the centralized resource scheduling mode is entered to perform sidelink communication with the second terminal if the resource configuration information sent by the second network equipment includes the third preset information, wherein the second network equipment is the same as or different from the first network equipment. It is guaranteed that the NR V2X terminal can normally perform sidelink communication of the NR terminal (NR sidelink) with other terminals. The communication range of the NR V2X terminal is enlarged, the utilization efficiency of resources (pools) is improved, and the performance and the stability of the system are improved.

DETAILED DESCRIPTION OF THE INVENTION

Figure 1:
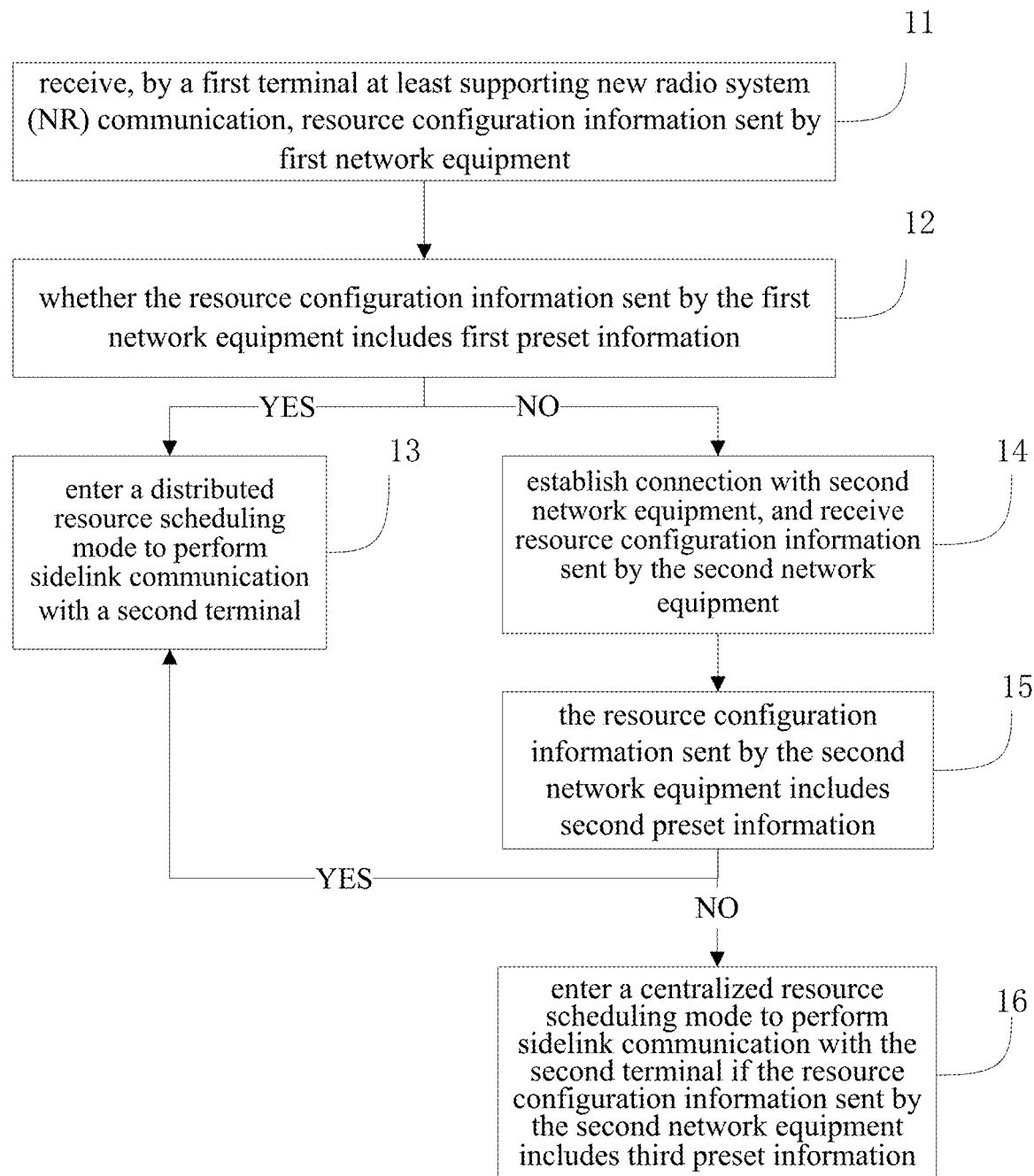
FIG. 1 is a flow chart of a sidelink communication method provided by the present disclosure.

Exemplary embodiments of the present disclosure will be described in more detail below in conjunction with the accompanying drawings. While the exemplary embodiments of the disclosure are shown in the drawings, it should be understood that the present disclosure may be embodied in various forms and should not be limited to the embodiments set forth herein. Rather, these embodiments are provided so that the present disclosure will be thorough and complete, and will fully convey the scope of the present disclosure to those skilled in the art.

The present disclosure provides a method for respectively or cooperatively configuring and scheduling an NR V2X terminal to perform sidelink transmission by network equipment (such as a base station) based on LTE Uu interface communication and network equipment (such as a base station) based on NR Uu interface communication. The NR V2X terminal (UE) may be two modes (including an LTE module and an NR module) or a single mode including only an NR module.

In the embodiments of the present disclosure, the NR V2X terminal can be configured and scheduled by the LTE base station, or can be configured and scheduled by the NR base station; or can be collaboratively configured and scheduled by the LTE base station and the NR base station.

At this time, the UE can choose to monitor only a control signaling from the NR base station through the Uu interface, and can also choose to simultaneously monitor control signalings of the LTE base station and the NR base station.

And after the condition is confirmed, the base station communicates with the NR terminal through the Uu interface, transmits an SIB message and an RRC reconfiguration message or other system messages, and determines the working mode of the UE. The SIBn here may be an SIB 21 in LTE technology or a new SIB message. The RRC reconfiguration message may be an RRC message in LTE technology or any other new reconfiguration message.

The contents of the configuration and scheduling information sent by the base station to the UE, i.e. the above SIB message and RRC reconfiguration message or other system messages, may include at least one of the following information:

at least one of a communication mode indication, a subcarrier spacing indication, a time domain resource granularity indication of a transmission service, a time-frequency domain resource position indication of the transmission service, a carrier index supporting transmission and reception, a supportable Band Width Part (BWP) index on each supportable carrier, a corresponding parameter under the Band Width Part (BWP) index, and a time division multiplexing (TDM)/frequency division multiplexing (FDM) indication;

Wherein, the corresponding parameter under the Band Width Part (BWP) index includes: a time domain resource granularity supporting service transmission and a frequency domain resource subcarrier spacing configuration and/or a frequency domain resource position corresponding to the Band Width Part index.

Alternatively, after the UE determines the working mode, the LTE base station transmits downlink control information (DCI formatN) through the Uu interface to configure and schedule sidelink communication of the UE through the PC5 interface. The design of DCI format N references or borrows DCI format 5A, all or part of DCI format 0_0/0_1/1_0/1_1, and includes at least one of the following indications: at least one of a scheduling mode indication, a time domain resource granularity indication of a transmission service, a time-frequency domain resource position indication of the transmission service, a cross-carrier scheduling indication, a frequency hopping indication, a frequency hopping resource position indication, a modulation and demodulation level, a Band Width Part (BWP) indication and a frequency domain resource subcarrier spacing;

When the NR base station establishes connection with the LTE base station, the LTE network uses an X2 interface to communicate with an Xn interface of the NR network. The NR base station transmits relevant configuration information (including but not limited to resource pool configuration, a scheduling signaling and the like) of NR sidelink to the LTE base station, and the LTE base station transmits the configuration information to the NR terminal in the form of an SIBn and an RRC reconfiguration message through the Uu interface for configuring and scheduling NR sidelink communication.

As shown in FIG. 1, an embodiment of the present disclosure provides a sidelink communication method, including:

Step 11, a first terminal at least supporting new radio system (NR) communication receives resource configuration information sent by first network equipment;

Step 12, if the resource configuration information sent by the first network equipment includes first preset information, step 13 is started;

Step 13, the first terminal enters a distributed resource scheduling mode to perform sidelink communication with a second terminal, otherwise, step 14 is started;

Step 14, the first terminal establishes connection with second network equipment and receives resource configuration information sent by the second network equipment;

Step 15, if the resource configuration information sent by the second network equipment includes second preset information, step 13 is started, namely the first terminal enters the distributed resource scheduling mode to perform sidelink communication with the second terminal;

Step 16, if the resource configuration information sent by the second network equipment includes third preset information, the first terminal enters a centralized resource scheduling mode to perform sidelink communication with the second terminal.

The second network equipment is the same as or different from the first network equipment, wherein the first terminal may be an NR V2X terminal (UE), specifically may be two modes (an LTE module and an NR module), or may be a single mode only including an NR module.

The resource allocation information here is a new system information block (SIBNew) including: an SIB21, an SIB23 or an SIBN including preset system information other than the SIB21 and the SIB23.

The resource configuration information includes: at least one of a communication mode indication, a subcarrier spacing indication, a time domain resource granularity indication of a transmission service, a time-frequency domain resource position indication of the transmission service, a carrier index supporting transmission and reception, a supportable Band Width Part (BWP) index on each supportable carrier, a corresponding parameter under each Band Width Part (BWP) index and a time-division multiplexing (TDM)/ frequency-division multiplexing (FDM) indication;

The corresponding parameter under each Band Width Part (BWP) index includes: a time domain resource granularity supporting service transmission and a frequency domain resource subcarrier spacing configuration and/or a frequency domain resource position corresponding to the Band Width Part index.

The resource configuration information here may be configured via an SIB message and an RRC reconfiguration message or other system messages.

The first preset information includes: a communication mode indication including: a distributed resource scheduling mode or a centralized resource scheduling mode.

The second preset message includes: a Z1, wherein the Z1 may be replaced by any other name;

The third preset message includes: a Z2, wherein Z2 may be replaced by any other name;

The resource configuration information sent by the second network equipment may be an SL-V2X-ConfigDedicated-r14 message in a communication mode determining process (a shared carrier or a dedicated carrier) of a V2X node within the coverage of the cellular network, the Z1 may be a ue-Selected-r14 message (i.e. a terminal selection message), and the Z2 may be a scheduled-r14 message (i.e. a scheduling message).

In a specific embodiment of the present disclosure, step 13 may include:

Step 131, a resource is selected from the resource configuration information sent by the first network equipment; and Step 132, sidelink communication with the second terminal is performed according to the selected resource and the first preset information.

In this step, the first terminal enters the distributed resource scheduling mode (i.e. Model 4) according to the resource configuration information sent by the first network equipment and performs sidelink communication with the second terminal.

In a specific embodiment of the present disclosure, step 14 may include: Step 141, connection with the second network equipment is established and a radio resource control signaling (RRC) message sent by the second network equipment is received; and Step 142, resource configuration information of the second network equipment is obtained according to the RRC message.

And after the resource configuration information of the second network equipment is obtained, if the resource configuration information sent by the second network equipment includes the second preset information, the first terminal enters the distributed resource scheduling mode (i.e. Model 4) to perform sidelink communication with the second terminal, otherwise, enters step 16, wherein step 16 specifically includes steps 161, 162 and 163.

Step 161, the first terminal transmits a resource scheduling request to the second network equipment through the Uu interface.

Step 162, the first terminal receives resource configuration information in the centralized resource scheduling mode sent by the second network equipment; specifically, receives downlink control information (DCI FormatN) (i.e. a scheduling grant for SA (scheduling assignment) and data) sent by the second network equipment; and obtains the resource configuration information in the centralized resource scheduling mode according to the DCI FormatN.

The DCI Format N here includes: at least one of a scheduling mode indication, a time domain resource granularity indication of a transmission service, a time-frequency domain resource position indication of the transmission service, a cross-carrier scheduling indication, a frequency hopping indication, a frequency hopping resource position indication, a modulation and demodulation level, a Band Width Part (BWP) indication and a frequency domain resource subcarrier spacing.

In some embodiments of the present disclosure, the DCI FormatN includes: a semi-persistent scheduling activation/deactivation indicator.

In some embodiments of the present disclosure, the SA includes sidelink control information (SCI).

Step 163, the first terminal performs sidelink communication with the second terminal according to the resource configuration information in the centralized resource scheduling mode; specifically, transmits a scheduling assignment (SA) signaling (SA) and/or data to the second terminal on a granted resource of the resource configuration information.

Further, in this embodiment, before step 161, i.e. the first terminal transmits a resource scheduling request to the second network equipment, step 16 further includes:

Step 160, the first terminal performs an initialization with the second network equipment through the Uu interface. The initialization herein may include: configurations of related information between the first terminal and the second network equipment, etc.

In an alternative embodiment, before the first terminal performing the initialization with the second network equipment through the Uu interface, the method further includes: the second network equipment obtains the resource configuration information sent by the second network equipment to the first terminal from third network equipment, wherein the third network equipment may be the same as or different from the first network equipment or the second network equipment.

Here, the second network equipment may communicate with the third network equipment may communicate through the X2 or Xn interface.

In another embodiment of the present disclosure, before the first terminal performs sidelink communication with the second terminal, step 13 may include:

resource partitioning and/or reconfiguration are performed on a granted resource of the resource configuration information sent by the first network equipment. Therefore, finer granularity resource partitioning is realized, and the requirement of the NR terminal on fine granularity resources is met.

In another embodiment of the present disclosure, before the first terminal performs sidelink communication with the second terminal, step 16 may include:

resource partitioning and/or reconfiguration are performed on a granted resource of the resource configuration information sent by the second network equipment. Therefore, finer granularity resource partitioning is realized, and the requirement of the NR terminal on fine granularity resources is met.

In all the above embodiments of the present disclosure, the first network equipment is a first base station supporting long term evolution technology (LTE), LTE-A or eLTE or a second base station supporting an NR system, and the second network equipment is a second base station supporting an NR system or a first base station supporting long term evolution technology (LTE), LTE-A or eLTE.

Figure 2:
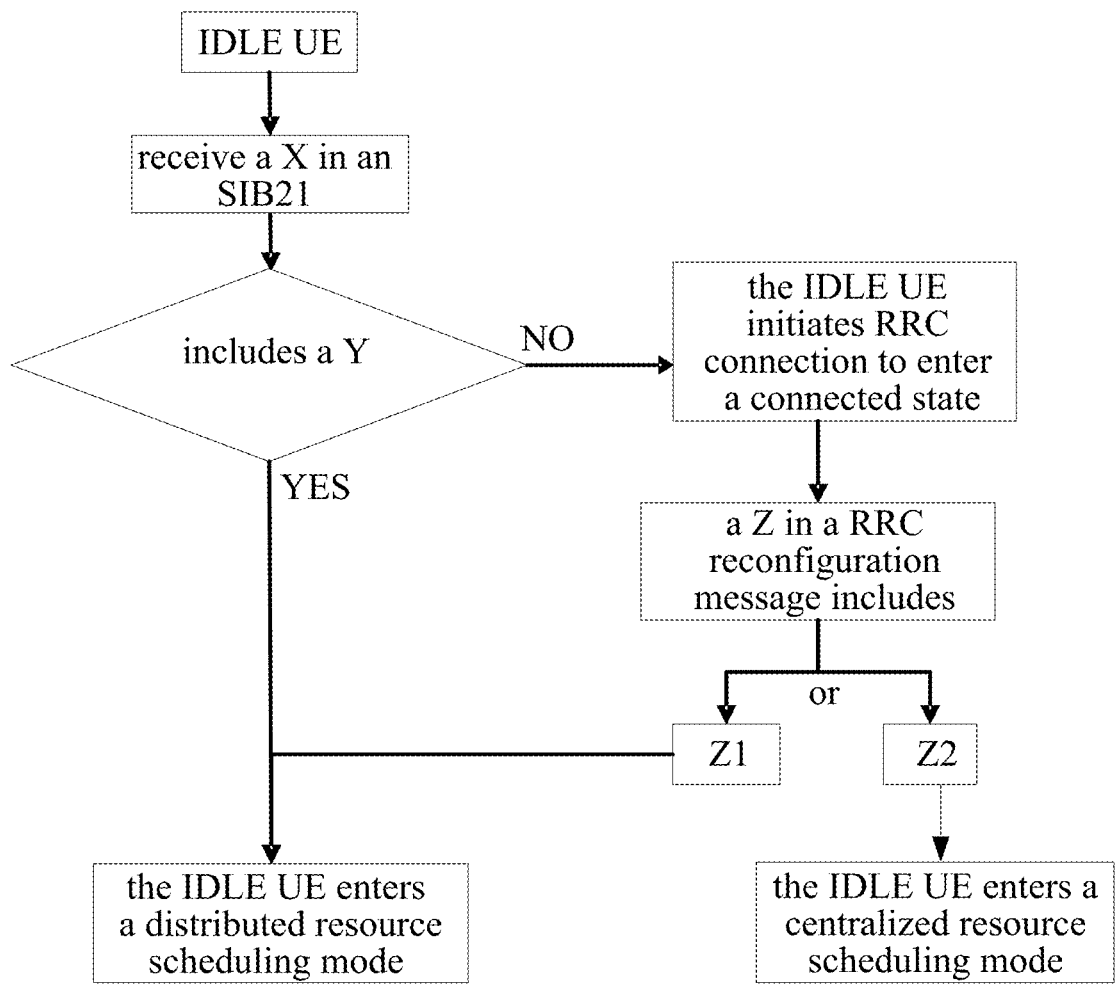
FIG. 2 is schematic diagram of a determination process (shared or dedicated carrier) of a communication mode of a V2X node within cellular network coverage of the present disclosure.

Specific implementations of the above method will now be described in conjunction with specific embodiments:

Example 1: as shown in FIG. 2, if a first terminal (e.g. an IDLE UE1) receives an SIB21 (SystemInformationBlock21) (resource configuration information from first network equipment, which may be an LTE base station), the UE1 checks whether an X (e.g. SL-V2X-ConfigCommon-r14) in the SIB21 includes information Y (e.g. V2X-CommTxPool-NormalCommon-r14) of a transmission resource pool. If the SIB 21 received by the IDLE UE1 includes the information Y of the transmission resource pool, the IDLE UE1 enters a distributed resource scheduling mode (Mode 4), directly uses the information Y of the resource pool to perform a resource selection process, and performs sidelink communication with a second terminal by using the selected resource.

If the IDLE UE1 receives the SIB21, and the UE checks that the X in the SIB21 does not include the information Y of the transmission resource pool, the IDLE state UE1 initiates a RRC connection process to enter a connected state (here, the connection may be established with second network equipment, which may be the same as or different from the first network equipment). If a Z (e.g. SL-V2X-ConfigDicated-r14) in resource configuration information (e.g. a RRC reconfiguration message) sent by the second network equipment includes Z1 (e.g. ue-Selected-r14) information, the UE1 enters the distributed resource scheduling mode (Mode 4), and performs the resource selection process by using the configured resource pool information.

If the IDLE UE1 receives the SIB21, and the UE checks that the X in the SIB21 does not includes the information Y of the transmission resource pool. Then the IDLE UE1 initiates the RRC connection process to enter the connected state (here, the connection may be established with the second network equipment, which may be the same or different from the first network equipment). The Z (e.g. SL-V2X-ConfigDicated-r14) in the resource configuration information (e.g. a RRC reconfiguration message) sent by the second network equipment includes Z2 (e.g. scheduled-r14) information, and then UE1 enters Mode 3 (a centralized resource scheduling mode) to perform PC5 interface communication according to the scheduling of the base station.

Figure 3:
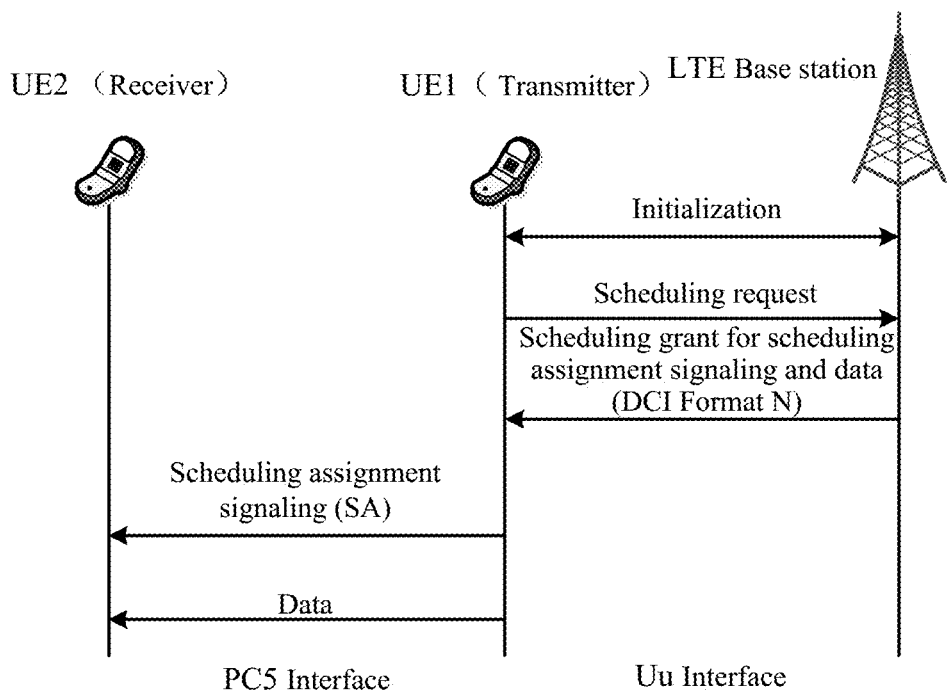
FIG. 3 is a flow chart of PC5 interface communication of UE entering Mode 3 (centralized resource scheduling mode) according to a scheduling of a base station in Embodiment 1 of the present disclosure.

Specifically, as shown in FIG. 3, the UE 1 (a transmitter) enters a centralized resource scheduling mode (Mode 3) to perform PC 5 interface communication according to the scheduling of the base station, includes:

the UE1 reports its own resource scheduling request and auxiliary information including service related information (packet size, service period, etc.), position information, etc. to an LTE base station (the second network equipment) through a Uu interface;

the LTE base station configures a resource occupation condition of NR sidelink Mode 3;

the LTE base station transmits a DCI format N scheduling signaling to the UE1;

the UE 1 performs NR sidelink communication with a second terminal UE2 (a receiver) according to the information indicated in the DCI format N.

Example 2

As shown in FIG. 2, if a first terminal (e.g. an IDLE UE1) receives an SIB21 (SystemInformationBlock21) (resource configuration information from first network equipment, which may be an LTE base station), the UE1 checks whether a X (e.g. SL-V2X-ConfigCommon-r14) in the SIB21 includes information Y (e.g. V2X-CommTxPoolNormal-Common-r14) of a transmission resource pool. If the SIB 21 received by the IDLE UE1 includes the information Y of the transmission resource pool, the IDLE UE1 enters a distributed resource scheduling mode (Mode 4) to further perform resource partitioning, reallocation and other operations by using the information Y of the resource pool, then enters a resource selection process, and performs sidelink communication with a second terminal by using the selected resource.

If the IDLE UE1 receives the SIB21, and the UE1 checks that the X in the SIB21 does not include the information Y of the transmission resource pool. Then the IDLE UE1 initiates a RRC connection process to enter a connected state (here, the connection may be established with second network equipment, which may be the same or different from the first network equipment). If a Z (e.g. SL-V2X-ConfigDicated-r14) in resource configuration information (e.g. a RRC reconfiguration message) sent by the second network equipment includes Z1 information (e.g. ue-Selected-r14), the UE1 enters the distributed resource scheduling mode (Mode 4) further to perform the resource partitioning, reallocation and other operations by using a granted resource of the RRC configuration message.

If the IDLE UE1 receives the SIB21, and the UE1 checks that the X in the SIB21 does not includes the information Y of the transmission resource pool. Then the IDLE UE1 initiates the RRC connection process to enter the connected state (here, the connection may be established with the second network equipment, which may be the same or different from the first network equipment). If the Z (e.g. SL-V2X-ConfigDicated-r14) in the resource configuration information (e.g. a RRC reconfiguration message) sent by the second network equipment includes Z2 (e.g. scheduled-r14) information, and then the UE1 enters Mode 3 (a centralized resource scheduling mode) to perform PC5 interface communication according to the scheduling of the base station.

Figure 4:
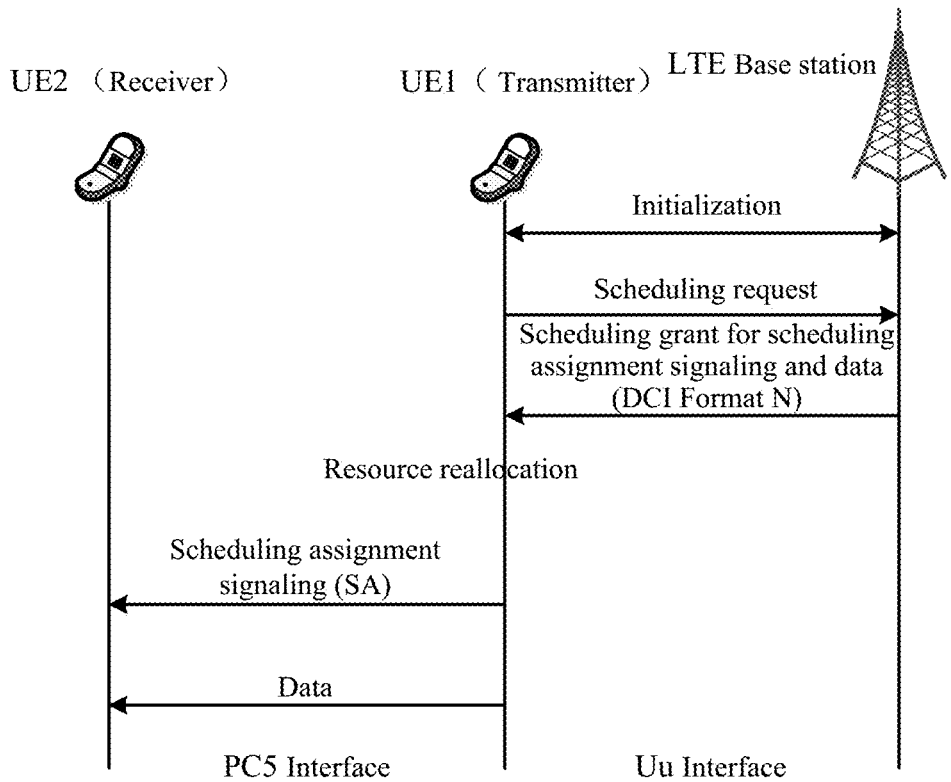
FIG. 4 is a flow chart of PC5 interface communication of UE entering Mode 3 (centralized resource scheduling mode) according to a scheduling of a base station in Embodiment 2 of the present disclosure.

Specifically, as shown in FIG. 4, the UE 1 (transmitter) enters Mode 3 (a centralized resource scheduling mode) to perform PC 5 interface communication according to the scheduling of the base station, includes:

the UE1 reports its own resource scheduling request and auxiliary information including service related information (packet size, service period, etc.), location information, etc. to an LTE base station (the second network equipment) through a Uu interface;

the LTE base station configures a resource occupation condition of NR sidelink Mode 3;

the LTE base station transmits a DCI format N scheduling signaling to the UE1;

the UE1 further combines and partitions resources reconfigured by the SIB21 or the RRC according to information indicated in the DCI format N so as to efficiently use the resource pool;

the UE1 perform NR sidelink communication with the UE 2 (a receiver).

In the embodiment, the resource configuration information included in the SIB21 is configured by the LTE base station, and the NR network adopts the new characteristics of multiple kinds of subcarrier spacings (15 kHz, 30 kHz, 60 kHz, 120 kHz), a BWP, a shorter transmission time slot and the like, so that the NR UE1 further combines and partitions the resources reconfigured by the SIB21 and the RRC so as to efficiently use the resource pool.

The UE 1 partitions and reconfigures the resources configured by the LTE base station according to the smaller granularity in NR, and then perform sidelink communication with other UEs through the PC5 interface by using these fine partitioned resources.

Example 3

Example 3 is the same as example 1, except that SystemInformationBlock21 (SIB21) may be replaced by other system messages or an SIBn, such as, but not limited to, an SIB 23.

Example 4

Figure 5:
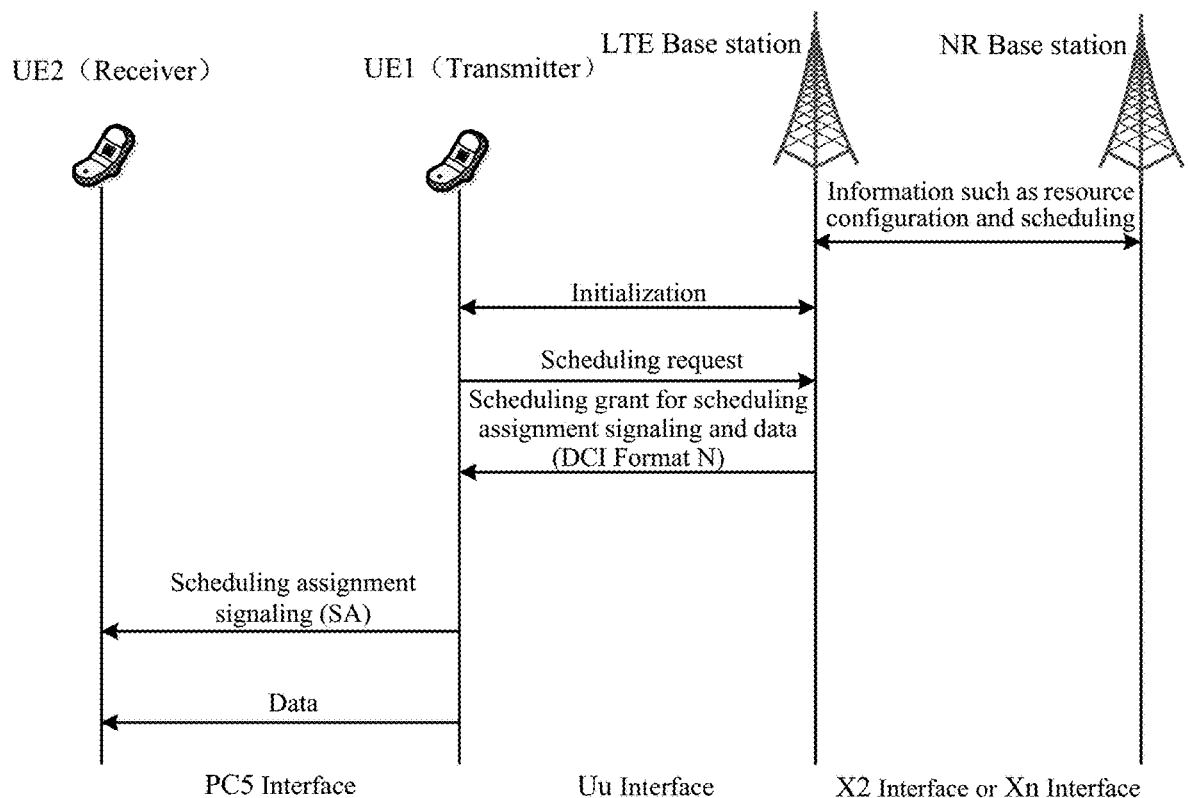
FIG. 5 is a flow chart of PC5 interface communication of UE entering Mode 3 (centralized resource scheduling mode) according to a scheduling of a base station in Embodiment 4 of the present disclosure.

A working mode of a UE determined in this example 4 is the same as in example 1, as shown in FIG. 2. However, when the terminal enters Model 3 to perform NR sidelink communication with a UE2, as shown in FIG. 5, an NR base station establishes communication with an LTE base station, and the LTE base station and the NR base station are connected by using an X2 or an Xn interface. And the NR base station transmits configuration, scheduling and other information (i.e. resource configuration information) of NR sidelink to the LTE base station, and the LTE base station places the configuration, scheduling and other information in an SIB21 and configures same to the UE1.

Example 5

A working mode of a UE determined in this example 4 is the same as in example 2, as shown in FIG. 2. However, when a terminal enters Model 3 to perform NR sidelink communication with a UE2, an NR base station establishes communication with an LTE base station, and the LTE base station and the NR base station are connected by using an X2 or Xn interface. And the NR base station transmits information such as configuration and scheduling of NR sidelink (i.e. resource configuration information) to the LTE base station, and the LTE base station places the information such as configuration and scheduling in an SIBn and configures same to the UE1.

Example 6

As shown in FIG. 2, if a first terminal (e.g. a IDLE UE 1) receives an SIBn (SystemInformationBlockn) (resource configuration information from first network equipment, which may be an NR base station), the UE 1 checks whether an X (e.g. SL-V2X-ConfigCommon-r14) in the SIBn includes information Y (e.g. V2X-CommTxPoolNormalCommon-r14) of a transmission resource pool. If the SIBn received by the IDLE UE1 includes the information Y of the transmission resource pool (e.g. V2X-CommTxPoolNormalCommon-r14), then the IDLE UE1 enters a distributed resource scheduling mode (Mode 4) to perform a resource selection process by directly using the information Y of the resource pool.

If the IDLE UE1 receives the SIBn, and the UE1 checks that the X in the SIBn does not includes the information Y of the transmission resource pool. Then the IDLE UE1 initiates a RRC connection process to enter a connected state (here, the connection may be established with second network equipment, which may be the same or different from the first network equipment). If a Z (e.g. SL-V2X-ConfigDicated-r14) in resource configuration information (e.g. a RRC reconfiguration message) sent by the second network equipment includes Z1 information (e.g. ue-Selected-r14), then the UE enters the distributed resource scheduling mode (Mode 4) to perform the resource selection process by using a granted resource of the RRC reconfiguration message.

If the IDLE UE1 receives the SIBn, and the UE1 checks that the X in the SIBn does not includes the information Y of the transmission resource pool. Then the IDLE UE1 initiates the RRC connection process to enter the connected state (here, the connection may be established with the second network equipment, which may be the same or different from the first network equipment). If the Z (e.g. SL-V2X-ConfigDicated-r14) in the resource configuration information (e.g. a RRC reconfiguration message) sent by the second network equipment includes Z2 (e.g. scheduled-r14) information, and then UE1 enters a centralized resource scheduling mode (Mode 3) to perform PC5 interface communication according to the scheduling of the base station.

Figure 6:
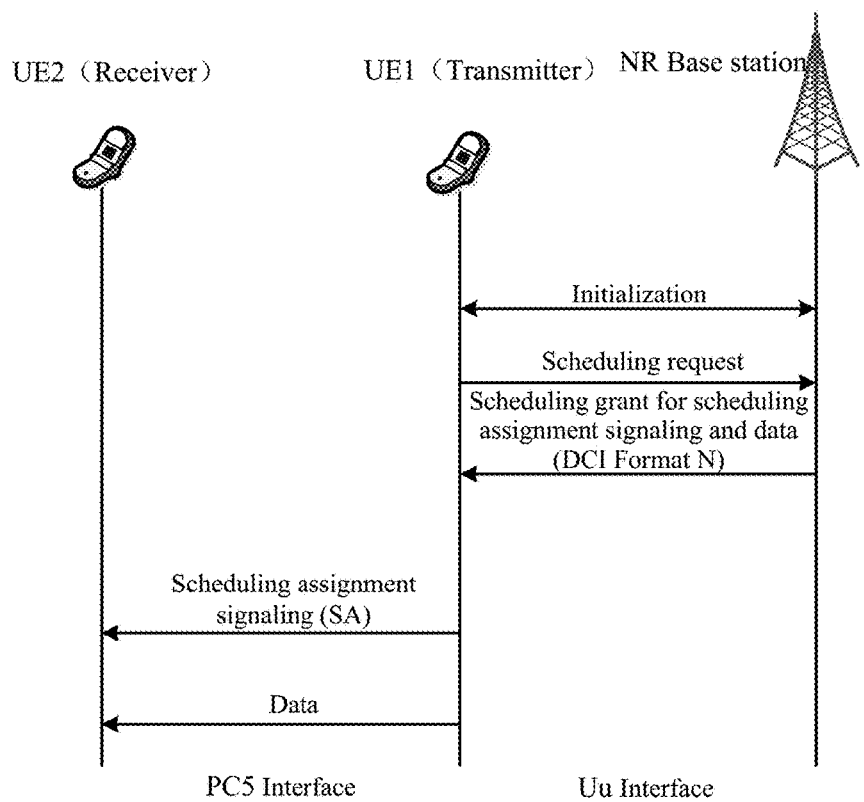
FIG. 6 is a flow chart of PC5 interface communication of UE entering Mode 3 (centralized resource scheduling mode) according to a scheduling of a base station in Embodiment 6 of the present disclosure.

Specifically, as shown in FIG. 6, the UE1 enters a centralized resource scheduling mode (Mode 3) to perform PC 5 interface communication according to the scheduling of the base station, includes:

the UE1 (a transmitter) reports its own resource scheduling request and auxiliary information including service related information (packet size, service period, etc.), position information, etc. to an NR base station through a Uu interface;

the NR Base Station configures a resource occupancy condition of NR Sidelink Mode 3;

the NR base station transmits a DCI format N scheduling signaling to the UE1;

the UE 1 performs NR sidelink communication with a UE2 (a receiver) according to information indicated in the DCI format N.

Example 7

When the coverage of the NR network and the coverage of the LTE network exist at the same time, the dual-mode NR base station can configure and schedule LTE sidelink and NR sidelink through NR Uu, and in the embodiment, the NR base station may include: a LTE module and a NR module interacted with a terminal 1 according to the method as in the embodiment 6 for controlling a UE1 to perform NR sidelink communication with a UE2; the LTE module may interact with the terminal 1 and control the UE 1 to perform NR sidelink communication with the UE 2 according to the method as in any one of embodiments 1 to 5.

Example 8

Figure 7:
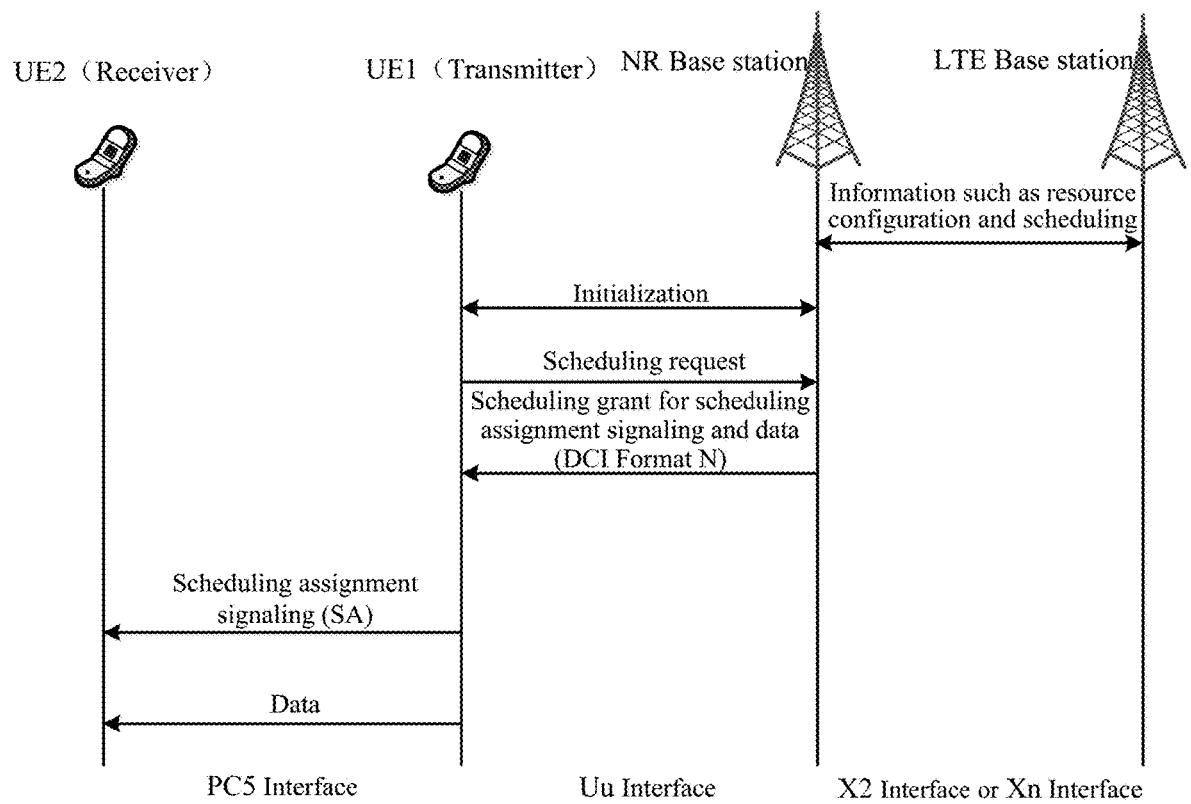
FIG. 7 is a flow chart of PC5 interface communication of UE entering Mode 3 (centralized resource scheduling mode) according to a scheduling of a base station in Embodiment 8 of the present disclosure.

A working mode of a UE determined in example 8 is the same as in example 6, as shown in FIG. 2. However, when a terminal enters Model 3 to perform NR sidelink communication with a UE2, as shown in FIG. 7, an NR base station establishes communication with a LTE base station, and the LTE base station and the NR base station are connected by using an X2 or an Xn interface, the LTE base station transmits configuration, scheduling and other information of LTE sidelink to the NR base station, and the NR base station places the configuration, scheduling and other information in a system message, an SIB21 and an RRC reconfiguration message.

The NR base station configures and schedules NR sidelink and LTE sidelink through a Uu interface, and at the moment, the dual-mode UE only needs to monitor a message of the NR Uu interface.

In the above embodiments of the present disclosure, the SIBn may be replaced by any other name such as, but not limited to, an SIB 23; Mode 3 and Mode 4 may be replaced by any other name such as, but not limited to, Mode 5 and Mode 6; the X, Y, Z, Z1 and Z2 may be replaced by any other name. The Xn interface may be replaced by any other name, such as but not limited to X3. The first base station supporting LTE generally refers to all 4G base stations including a LTE base station, a LTE-A evolution base station and the like. The UE1, UE2 are equipment performing sidelink communication of NR V2X terminals, roadside equipment, etc. The NR base station and the LTE base station transmit the SIBn including the communication mode determination, the resource pool configuration and the like to the NR terminal through the Uu interface to control NR sidelink communication. The resource (pool) configuration information included in the SIBn is different from the SIB21. After the SIB21 configuration message sent by the LTE base station through the Uu interface is received by the NR terminal, the NR terminal can further allocate and partition the obtained resources (pools), so that the resources are utilized more efficiently. The NR network and the LTE network will work independently and may access the same core network or different core networks. The NR network (a base station) establishes connection with the LTE network (base station) through an X2 interface or an Xn interface for communication, and exchange information such as resource configuration and scheduling of NR sidelink.

The above embodiments of the present disclosure apply to communications of LTE and NR V2X. According to the method that the NR base station and the LTE base station control and schedule NR sidelink through the Uu interface, the communication range of the NR V2X terminal is enlarged, the utilization efficiency of resources (pools) is improved, and the performance and the stability of a system are improved.

An embodiment of the present disclosure further provides a terminal being a first terminal supporting a new radio system (NR) communication, including:

a transceiver, configured to receive resource configuration information sent by first network equipment; and a processor, configured to enter a distributed resource scheduling mode to perform sidelink communication with a second terminal when the resource configuration information sent by the first network equipment includes first preset information, otherwise, establish connection with second network equipment and receive resource configuration information sent by the second network equipment;

enter the distributed resource scheduling mode (Mode 4) to perform sidelink communication with the second terminal when the resource configuration information sent by the second network equipment includes second preset information;

enter a centralized resource scheduling mode (Mode 3) to perform sidelink communication with the second terminal when the resource configuration information sent by the second network equipment includes third preset information, wherein the second network equipment is the same as or different from the first network equipment.

The resource configuration information is a new system information block (SIBNew) including an SIB21, an SIB23 or an SIBN including preset system information other than the SIB21 and the SIB23.

When entering the distributed resource scheduling mode to perform sidelink communication with the second terminal, the processor is configured to: select a resource by utilizing the configured resource pool information in the resource configuration information sent by the first network equipment; and perform sidelink communication with the second terminal according to the selected resource and the first preset information.

The second preset message includes: a terminal selection message, and the third preset message includes: a user scheduling message.

When establishing connection with the second network equipment, and receiving the resource configuration information sent by the second network equipment, the processor is configured to: establish connection with the second network equipment, receive a radio resource control signaling (RRC) message sent by the second network equipment; and obtain the resource configuration information according to the RRC message.

When entering a centralized resource scheduling mode to perform sidelink communication with the second terminal, the processor is configured to: transmit a resource scheduling request to the second network equipment through a Uu interface;

receive resource configuration information in the centralized resource scheduling mode sent by the second network equipment; and perform sidelink communication with the second terminal according to the resource configuration information in the centralized resource scheduling mode.

Before transmitting the resource scheduling request to the first network equipment through the Uu interface, the processor is configured to: perform an initialization with the second network equipment through the Uu interface.

The resource configuration information in the centralized resource scheduling mode sent by the second network equipment is received, includes: downlink control information (DCI FormatN) sent by the second network equipment is received; and the resource configuration information in the centralized resource scheduling mode is obtained according to the DCI FormatN.

Wherein the DCI Format N includes: at least one of a scheduling mode indication, a time domain resource granularity indication of a transmission service, a time-frequency domain resource position indication of the transmission service, a cross-carrier scheduling indication, a frequency hopping indication, a frequency hopping resource position indication, a modulation and demodulation level, a Band Width Part (BWP) indication and a frequency domain resource subcarrier spacing.

In some embodiments of the present disclosure, the DCI FormatN includes: a semi-persistent scheduling activation/deactivation indication.

When performing sidelink communication with the second terminal according to the resource configuration information in the centralized resource scheduling mode, the processor is configured to: transmit a scheduling assignment signaling (SA) and/or data to the second terminal on a granted resource of the resource configuration information in the centralized resource scheduling mode.

Before the first terminal performs the initialization with the first network equipment through the Uu interface, the processor is further configured to: obtain, by the second network, the resource configuration information in the centralized resource scheduling mode from the first network equipment.

Before performing sidelink communication with the second terminal, the processor is further configured to: perform resource partitioning and/or reallocation on granted resources of the resource configuration information.

Wherein the resource configuration information includes: at least one of a communication mode indication, a subcarrier spacing indication, a time domain resource granularity indication of a transmission service, a time-frequency domain resource position indication of the transmission service, a carrier index supporting transmission and reception, a supportable Band Width Part (BWP) index on each supportable carrier, a corresponding parameter under the Band Width Part (BWP) index, and a time division multiplexing (TDM)/frequency division multiplexing (FDM) indication.

Wherein the communication mode indication includes: a distributed resource scheduling mode or a centralized resource scheduling mode;

The corresponding parameter under the Band Width Part (BWP) index includes: a time domain resource granularity and a frequency domain resource subcarrier spacing configuration supporting service transmission and/or a frequency domain resource position corresponding to the Band Width Part index.

In the embodiment, the first network equipment is a first base station supporting Long Term Evolution (LTE), LTE-A or eLTE or a second base station supporting an NR system, and the second network equipment is a second base station supporting an NR system or a first base station supporting Long Term Evolution (LTE), LTE-A or eLTE.

All the above implementation modes in the embodiments of the method are applicable to the embodiment of the terminal, and the same technical effect can be achieved.

An embodiment of the present disclosure further provide a measuring device for measuring a value of a synchronizing signal block applied to a first terminal supporting new radio system (NR) communication, including:

a transceiving module, configured to receive resource configuration information sent by first network equipment; and a processing module, configured to enter a distributed resource scheduling mode to perform sidelink communication with a second terminal when the resource configuration information sent by the first network equipment includes first preset information, otherwise, establish connection with second network equipment and receive resource configuration information sent by the second network equipment;

enter the distributed resource scheduling mode to perform sidelink communication with the second terminal when the resource configuration information sent by the second network equipment includes second preset information;

enter a centralized resource scheduling mode to perform sidelink communication with the second terminal when the resource configuration information sent by the second network equipment includes third preset information, wherein the second network equipment is the same as or different from the first network equipment.

It is to be noted that the embodiment of the device is a device corresponding to the above method, and all the above implementation modes in the embodiments of the method are applicable to the embodiment of the terminal, and the same technical effects can be achieved.

Figure 8:
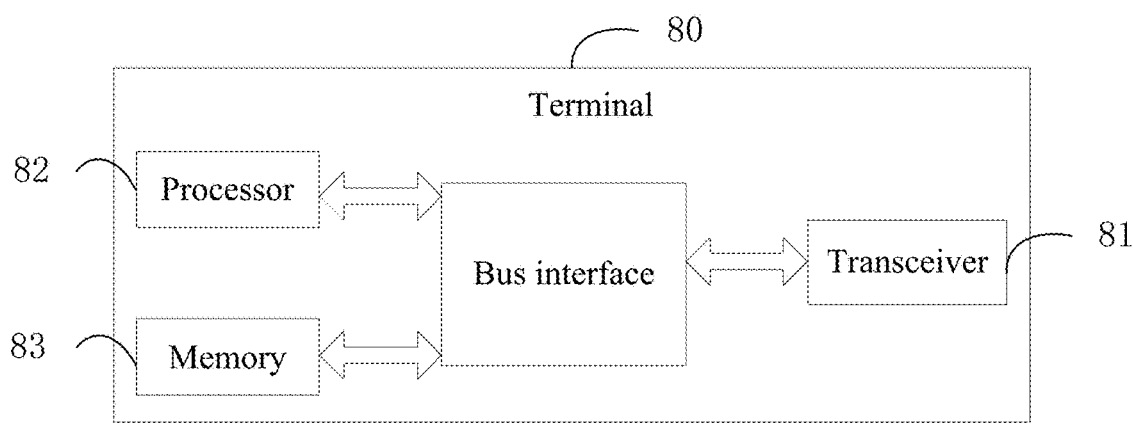
FIG. 8 is a schematic architectural diagram of a terminal provided by the present disclosure.

As shown in FIG. 8, an embodiment of the present disclosure further provides a terminal 80 being a first terminal supporting at least new radio system (NR) communication, including: a processor 82, configured to: receive resource configuration information sent by first network equipment; enter a distributed resource scheduling mode to perform sidelink communication with a second terminal if the resource allocation information sent by the first network equipment includes first preset information, otherwise, establish connection with second network equipment and receive resource configuration information sent by the second network equipment; enter the distributed resource scheduling mode to perform sidelink communication with the second terminal if the resource configuration information sent by the second network equipment includes second preset information; enter a centralized resource scheduling mode to perform sidelink communication with the second terminal if the resource configuration information sent by the second network equipment includes third preset information, wherein the second network equipment is the same as or different from the first network equipment.

All the above implementation modes in the embodiments of the method are applicable to the embodiment of the terminal, and the same technical effect can be achieved. The terminal 80 may further include: a memory 83 communicated with the processor 82 or the transceiver 81 via a bus interface or interface. The above functions of the transceiver 81 may also be implemented by the processor 82. The terminal of the present disclosure may further include other components, such as a user interface, that implement the above method.

An embodiment of the present disclosure further provides a method for controlling a terminal to perform sidelink communication applied to network equipment, including:

resource configuration information is transmitted to a first terminal at least supporting new radio system (NR) communication;

terminal is controlled to enter a distributed resource scheduling mode to perform sidelink communication with a second terminal if the resource configuration information sent by the first network equipment includes first preset information, otherwise, the first terminal is controlled to establish connection with second network equipment, and the second network equipment transmits resource configuration information to the first terminal;

the terminal is controlled to enter the distributed resource scheduling mode to perform sidelink communication with the second terminal if the resource configuration information sent by the second network equipment to the terminal includes second preset information;

the terminal is controlled to enter a centralized resource scheduling mode to perform sidelink communication with the second terminal if the resource configuration information sent by the second network equipment to the terminal includes third preset information; the second network equipment and the first network equipment are the same or different network equipment.

The resource configuration information is a new system information block (SIBNew) including an SIB21, an SIB23 or an SIBN including preset system information other than the SIB21 and the SIB23.

The terminal is controlled to enter a centralized resource scheduling mode to perform sidelink communication with the second terminal, includes:

a resource scheduling request sent by the first terminal is received;

resource configuration information in the centralized resource scheduling mode is transmitted to the first terminal; and the first terminal is enabled to perform sidelink communication with the second terminal according to the resource configuration information in the centralized resource scheduling mode.

Before the resource scheduling request sent by the first terminal is received, the method for controlling a terminal to perform sidelink communication further includes:

an initialization process is performed with the first terminal.

Wherein, the resource configuration information in the centralized resource scheduling mode transmitted to the first terminal, includes:

downlink control information (DCI FormatN) transmitted to the first terminal, wherein the DCI FormatN carries the resource configuration information in the centralized resource scheduling mode.

Wherein the DCI FormatN includes: at least one of a scheduling mode indication, a time domain resource granularity indication of a transmission service, a time-frequency domain resource position indication of the transmission service, a cross-carrier scheduling indication, a frequency hopping indication, a frequency hopping resource position indication, a modulation and demodulation level, a Band Width Part (BWP) indication and a frequency domain resource subcarrier spacing.

In some embodiments of the present disclosure, the DCI FormatN includes: a semi-persistent scheduling activation/deactivation indication.

Wherein, before the initialization process is performed with the first terminal, the method for controlling a terminal to perform sidelink communication further includes: the second network equipment acquires the resource configuration information in the centralized resource scheduling mode from the first network equipment.

Wherein the resource configuration information includes: at least one of a communication mode indication, a subcarrier spacing indication, a time domain resource granularity indication of a transmission service, a time-frequency domain resource position indication of the transmission service, a carrier index supporting transmission and reception, a supportable Band Width Part (BWP) index on each supportable carrier, a corresponding parameter under the Band Width Part (BWP) index, and a time division multiplexing (TDM)/frequency division multiplexing (FDM) indication.

In the embodiment, the first network equipment is a first base station supporting Long Term Evolution (LTE), LTE-A or eLTE or a second base station supporting an NR system, and the second network equipment is a second base station supporting an NR system or a first base station supporting Long Term Evolution (LTE), LTE-A or eLTE.

It is to be noted that the method on the network equipment side is a method corresponding to the above method on the terminal side, and all interactive methods and embodiments in the above method are applicable to the method on the network equipment side and can achieve the same technical effects.

Figure 9:
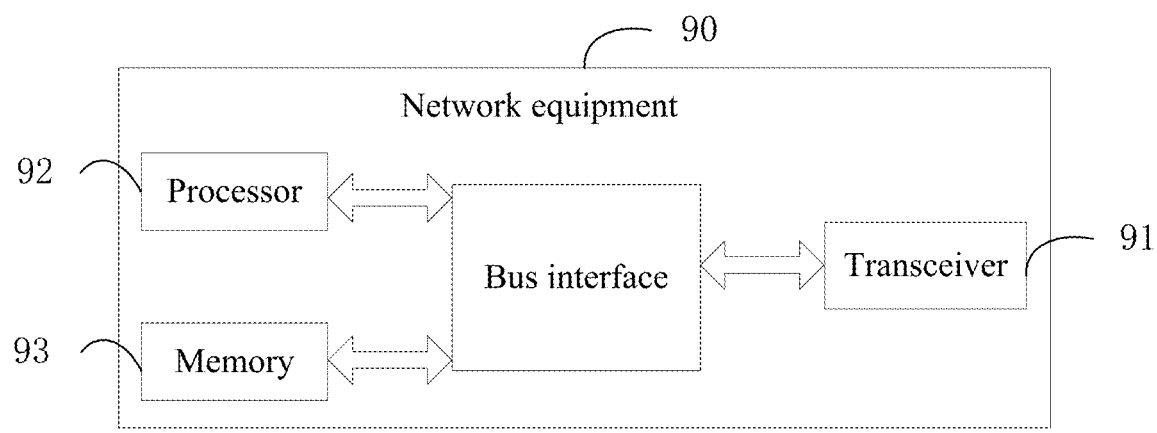
FIG. 9 is a schematic architectural diagram of network equipment provided by the present disclosure.

As shown in FIG. 9, an embodiment of the present disclosure further provides network equipment 90 being a first network equipment, including:

a transceiver 91, configured to transmit resource configuration information to a first terminal at least supporting new radio system (NR) communication; and a processor 92, configured to control the terminal to enter a distributed resource scheduling mode to perform sidelink communication with a second terminal when the resource configuration information sent by the first network equipment includes first preset information, otherwise, control the first terminal to establish connection with second network equipment, and transmit resource configuration information to the first terminal by the second network equipment;

control the terminal to enter the distributed resource scheduling mode to perform sidelink communication with the second terminal when the resource configuration information sent by the second network equipment to the terminal comprises second preset information;

control the terminal to enter a centralized resource scheduling mode to perform sidelink communication with the second terminal when the resource configuration information sent by the second network equipment to the terminal comprises third preset information; the second network equipment and the first network equipment are the same or different network equipment.

It is to be noted that the network equipment 90 may further include a memory 93 communicated with the processor 92 or the transceiver 91 via a bus interface or a interface. The above functions of the transceiver 91 may also be implemented by the processor 92. In addition, the network equipment is equipment corresponding to the above method on the network equipment side, all interactive methods and embodiments in the method are suitable for the network equipment, and the same technical effects can be achieved.

An embodiment of the present disclosure further provides equipment for controlling a terminal to perform sidelink communication applied to first network equipment, including:

a transceiving module, configured to transmit resource configuration information to a first terminal at least supporting new radio system (NR) communication; and a processing module, configured to control the terminal to enter a distributed resource scheduling mode to perform sidelink communication with a second terminal when the resource configuration information sent by the first network equipment includes first preset information, otherwise, control the first terminal to establish connection with second network equipment, and transmit resource configuration information to the first terminal by the second network equipment;

control the terminal to enter the distributed resource scheduling mode to perform sidelink communication with the second terminal when the resource configuration information sent by the second network equipment to the terminal includes second preset information;

control the terminal to enter a centralized resource scheduling mode to perform sidelink communication with the second terminal when the resource configuration information sent by the second network equipment to the terminal includes third preset information; the second network equipment and the first network equipment are the same or different network equipment.

It is to be noted that the equipment is corresponding equipment of the above method on the network equipment side, all interactive methods and embodiments in the above method, and the same technical effects can be achieved.

An Embodiment of the present disclosure further provides a computer storage medium including instructions that, when executed on a computer, cause the computer to perform the methods in all the above embodiments.

Those of ordinary skill in the art will appreciate that the various illustrative units and algorithm steps described in conjunction with the embodiments disclosed herein may be implemented as electronic hardware, or a combination of computer software and electronic hardware. Whether these functions are implemented as hardware or software depends upon the particular application and design constraints imposed on the solution. Those skilled in tha art may implement the described function in varying ways for each particular application, but such implementation decisions should not be interpreted as causing a departure from the scope of the present disclosure.

It will be clear to a person skilled in the art that, for the convenience and brevity of description, the specific workings of the systems, devices and units described above may be referred to in the corresponding process of the preceding embodiments of the methods and will not be described in detail here.

In the embodiments provided by the present disclosure, it should be understood that the disclosed devices and methods may be implemented in other ways. For example, the embodiments of the devices described above are merely illustrative, e.g. the division of units is only one logical function division and may be implemented in practice in another way, e.g. a plurality of units or components may be combined or integrated into another system, or some features may be omitted, or may not be implemented. Alternatively, the coupling or direct coupling or communicative connection shown or discussed with respect to one another may be an indirect coupling or communicative connection through some interface, devices, or units, whether electrical, mechanical, or otherwise.

The units illustrated as separate components may or may not be physically separate, and the components shown as units may or may not be physical units, i.e. may be located in one place, or may be distributed across multiple network units. Some or all of the units may be selected as necessary to achieve the objectives of the embodiments.

In addition, the functional units in the various embodiments of the present disclosure may be integrated into one processing unit, each unit may be physically present separately, or two or more units may be integrated into one unit.

The functions, if implemented in software functional units and sold or used as stand-alone products, may be stored in a computer readable storage medium. On the basis of this understanding, the technical solution of the present disclosure, or parts contributing to the related art, may be embodied in the form of a software product stored in a storage medium including various instructions for causing a computer device (may be a personal computer, a server, or network equipment or the like) performs all or part of the steps of the methods described in the various embodiments of the present disclosure. The afore mentioned storage medium includes: a U disk, a removable hard disk, a ROM, a RAM, a magnetic disk or an optical disk and the like can store program codes.

Furthermore, it should be noted that in the devices and methods of the present disclosure, it is apparent that the components or steps may be disassembled and/or recombined. Such decomposition and/or recombination should be considered as equivalents of the present disclosure. Also, the steps of performing the above series of processes may naturally be performed chronologically in the order illustrated, but need not necessarily be performed chronologically, and some steps may be performed in parallel or independently of one another. Those of ordinary skill in the art will appreciate that all or any of the steps or components of the methods and devices of the present disclosure may be implemented in hardware, firmware, software, or a combination thereof in any computing device (including processors, storage media, etc.) or network of the computing devices. This can be accomplished by those of ordinary skill in the art having read this disclosure by using their basic programming skills.

Thus, the objects of the present disclosure may also be achieved by running a program or a set of programs on any computing device. The computing device may be a known general purpose device. Accordingly, the objects of the present disclosure may also be achieved simply by providing a program product including program codes that implements the methods or devices. That is, such a program product also constitutes the present disclosure, and a storage medium storing such a program product also constitutes the present disclosure. Obviously, the storage medium may be any known storage medium or any storage medium developed in the future. It should also be noted that in the devices and methods of the present disclosure, it is apparent that the components or steps may be disassembled and/or recombined. Such decomposition and/or recombination should be considered as equivalents of the present disclosure. Also, the steps for performing the series of processes described above may naturally be performed chronologically in the order illustrated, but need not necessarily be performed chronologically. Some steps may be performed in parallel or independently of each other.

While the described embodiments are alternative embodiments of the present disclosure, it will be understood by those skilled in the art that various improvements and modifications may be made without departing from the spirit of the present disclosure, and these improvements and modifications shall fall within the scope of the present disclosure.

What is claimed is:

1. A sidelink communication method, comprising:
receiving, by a first terminal at least supporting new radio system (NR) communication, resource configuration information sent by a first network equipment;
entering a distributed resource scheduling mode to perform sidelink communication with a second terminal if the resource configuration information sent by the first network equipment comprises first preset information, otherwise, establishing connection with a second network equipment, and receiving resource configuration information sent by the second network equipment;
entering the distributed resource scheduling mode to perform sidelink communication with the second terminal if the resource configuration information sent by the second network equipment comprises second preset information;
entering a centralized resource scheduling mode to perform sidelink communication with the second terminal according to the resource configuration information sent by the second network equipment comprising third preset information when the resource configuration information sent by the second network equipment does not comprise the second present information;
wherein the second network equipment and the first network equipment are the same or different network equipment and the resource configuration information sent by the first network equipment does not comprise the first preset information.

2. The sidelink communication method of claim 1, wherein the resource configuration information sent by the second network equipment is a new system information block (SIBn) comprising a system information block (SIB21), a system information block (SIB23) or another SIBn comprising preset system information other than the SIB21 and the SIB23.

3. The sidelink communication method of claim 1, wherein the entering a distributed resource scheduling mode to perform sidelink communication with a second terminal, comprises:
selecting a resource from resource pool information in the resource configuration information sent by the first network equipment; and
performing sidelink communication with the second terminal according to the selected resource and the first preset information.

4. The sidelink communication method of claim 1, wherein the second preset message comprises: a terminal selection message; and the third preset message comprises: a user scheduling message.

5. The sidelink communication method of claim 4, wherein the establishing connection with second network equipment, and receiving resource configuration information sent by the second network equipment, comprises:

establishing connection with the second network equipment, receiving a radio resource control signaling (RRC) message sent by the second network equipment; and obtaining the resource configuration information according to the RRC message.

6. The sidelink communication method of claim 1, wherein the entering a centralized resource scheduling mode to perform sidelink communication with the second terminal, comprises:

transmitting a resource scheduling request to the second network equipment;

receiving resource configuration information in the centralized resource scheduling mode sent by the second network equipment; and performing sidelink communication with the second terminal according to the resource configuration information in the centralized resource scheduling mode.

7. The sidelink communication method of claim 6, prior to transmitting the resource scheduling request to the second network equipment, further comprising:

performing initialization with the second network equipment.

8. The sidelink communication method of claim 7, prior to performing initialization with the second network equipment, further comprising:

obtaining, by the second network equipment, the resource configuration information in the centralized resource scheduling mode from the first network equipment.

9. The sidelink communication method of claim 6, wherein the receiving resource configuration information in the centralized resource scheduling mode sent by the second network equipment, comprises:

receiving downlink control information (DCI FormatN) sent by the second network equipment; and obtaining the resource configuration information in the centralized resource scheduling mode according to the DCI FormatN.

10. The sidelink communication method of claim 9, wherein the DCI FormatN comprises: at least one of a scheduling mode indication, a time domain resource granularity indication of a transmission service, a time-frequency domain resource position indication of the transmission service, a cross-carrier scheduling indication, a frequency hopping indication, a frequency hopping resource position indication, a modulation and demodulation level, a Band Width Part (BWP) indication and a frequency domain resource subcarrier spacing.

11. The sidelink communication method of claim 9, wherein the performing sidelink communication with the second terminal according to the resource configuration information in the centralized resource scheduling mode, comprises: transmitting a scheduling control signaling and/or service information to the second terminal on a granted resource of the resource configuration information in the centralized resource scheduling mode.

12. A non-transitory computer storage medium comprising instructions which, when run on a computer, cause the computer to perform the method of claim 1.

13. A method for controlling a terminal to perform sidelink communication, comprising:

transmitting, by a first network equipment, resource configuration information to a first terminal at least supporting new radio system (NR) communication;

controlling the terminal to enter a distributed resource scheduling mode to perform sidelink communication with a second terminal if the resource configuration information sent by the first network equipment comprises first preset information, otherwise, controlling the first terminal to establish connection with a second network equipment, and transmitting, by the second network equipment, resource configuration information to the first terminal;

controlling the terminal to enter the distributed resource scheduling mode to perform sidelink communication with the second terminal if the resource configuration information sent by the second network equipment to the terminal comprises second preset information;

controlling the terminal to enter a centralized resource scheduling mode to perform sidelink communication with the second terminal according to the resource configuration information sent by the second network equipment to the terminal comprising third preset information when the resource configuration information sent by the second network equipment does not comprise the second present information;

wherein the second network equipment and the first network equipment are the same or different network equipment and the resource configuration information sent by the first network equipment does not comprise the first preset information.

14. The method for controlling a terminal to perform sidelink communication of claim 13, wherein the resource configuration information transmitted by the second network equipment is a new system information block (SIBn) comprising: a system information block (SIB21), a system information block (SIB23) or another SIBn comprising preset system information other than the SIB21 and the SIB23.

15. The method for controlling a terminal to perform sidelink communication of claim 13, wherein the controlling the terminal to enter a centralized resource scheduling mode to perform sidelink communication with the second terminal, comprises:

receiving a resource scheduling request sent by the first terminal;

transmitting resource configuration information in the centralized resource scheduling mode to the first terminal; and enabling the first terminal to perform sidelink communication with the second terminal according to the resource configuration information in the centralized resource scheduling mode.

16. The method for controlling a terminal to perform sidelink communication of claim 15, prior to receiving a resource scheduling request sent by the first terminal, further comprising:

performing initialization with the first terminal.

17. The method for controlling a terminal to perform sidelink communication of claim 15, wherein the resource configuration information in the centralized resource scheduling mode transmitted to the first terminal, comprises:

downlink control information (DCI FormatN) transmitted to the first terminal, and the DCI FormatN carries the resource configuration information in the centralized resource scheduling mode.

18. The method for controlling a terminal to perform sidelink communication of claim 17, wherein the DCI FormatN comprises: at least one of a scheduling mode indication, a time domain resource granularity indication of a transmission service, a time-frequency domain resource position indication of the transmission service, a cross-carrier scheduling indication, a frequency hopping indication, a frequency hopping resource position indication, a modulation and demodulation level, a Band Width Part (BWP) indication and a frequency domain resource subcarrier spacing.

19. A network equipment, which is a first network equipment, comprising: a processor, configured to implement the method for controlling a terminal to perform sidelink communication according to claim 13.

20. A terminal being a first terminal supporting new radio system (NR) communication, comprising:
   a transceiver, configured to receive resource configuration information sent by a first network equipment; and
   a processor, configured to enter a distributed resource scheduling mode to perform sidelink communication with a second terminal when the resource configuration information sent by the first network equipment comprises first preset information, otherwise, establish connection with a second network equipment, and receive resource configuration information sent by the second network equipment;
   enter the distributed resource scheduling mode to perform sidelink communication with the second terminal when the resource configuration information sent by the second network equipment comprises second preset information;
   enter a centralized resource scheduling mode to perform sidelink communication with the second terminal when the resource configuration information sent by the second network equipment comprising third preset information when the resource configuration information sent by the second network equipment does not comprise the second present information;
   wherein the second network equipment is the same as or different from the first network equipment and the resource configuration information sent by the first network equipment does not comprise the first preset information.

* * * * *